United States Patent
Depape et al.

(10) Patent No.: US 9,174,744 B2
(45) Date of Patent: Nov. 3, 2015

(54) METHOD AND SYSTEM FOR AIDING THE NAVIGATION OF AN AIRCRAFT

(71) Applicant: Airbus Operations (SAS), Toulouse (FR)

(72) Inventors: Pierre Depape, Paulhac (FR); Marie-Christine Bressolle, Cugnaux (FR); Clara Frick, Tournefeuille (FR); Elizabeth Clairsinvil, Colomiers (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 0 days.

(21) Appl. No.: 14/286,146

(22) Filed: May 23, 2014

(65) Prior Publication Data

US 2014/0350753 A1    Nov. 27, 2014

(30) Foreign Application Priority Data

May 27, 2013   (FR) ..................... 13 54766

(51) Int. Cl.

| | |
|---|---|
| *G01C 23/00* | (2006.01) |
| *G01S 13/00* | (2006.01) |
| *B64D 45/00* | (2006.01) |
| *G08G 5/00* | (2006.01) |
| *G08G 5/02* | (2006.01) |
| *G08G 5/06* | (2006.01) |

(52) U.S. Cl.
CPC .............. *B64D 45/00* (2013.01); *G01C 23/00* (2013.01); *G08G 5/00* (2013.01); *G08G 5/0047* (2013.01); *G08G 5/02* (2013.01); *G08G 5/06* (2013.01)

(58) Field of Classification Search
CPC . G08G 5/0039; G08G 5/0013; G08G 5/0021; G08G 5/003; G08G 5/0034; G08G 5/0043; G08G 5/0052; G08G 5/0082; G08G 5/02; G08G 5/025; G08G 5/00; G08G 5/0091; G08G 5/0047; G08G 5/0056; G08G 5/006
USPC ......... 701/3–18, 23, 26, 28, 36, 38, 120, 528; 340/945, 948, 961, 855.6, 951, 340/963–983; 342/29–35, 63, 357.53; 244/75.1–221
See application file for complete search history.

(56) References Cited

U.S. PATENT DOCUMENTS

| | | | |
|---|---|---|---|
| 2004/0098358 A1* | 5/2004 | Roediger | ................. G06N 5/00 706/46 |
| 2008/0125962 A1 | 5/2008 | Wipplinger et al. | |

(Continued)

FOREIGN PATENT DOCUMENTS

| | | |
|---|---|---|
| EP | 2048477 | 4/2009 |
| EP | 2296127 | 3/2011 |
| EP | 2434258 | 3/2012 |

OTHER PUBLICATIONS

French Search Report, Apr. 4, 2014.

*Primary Examiner* — Muhammad Shafi
(74) *Attorney, Agent, or Firm* — Greer, Burns & Crain, Ltd.

(57) ABSTRACT

A system including at least one global navigation database including data for aerial navigation and airport navigation of the aircraft and data mentioned on navigation maps, a central unit for carrying out a contextualized filtering of data intended for a display and received, at least in part, from said navigation database, and a display device for carrying out the display on one and the same screen, said display being based on information from said contextualized filtering.

13 Claims, 3 Drawing Sheets

(56) References Cited

U.S. PATENT DOCUMENTS

| | | |
|---|---|---|
| 2009/0093953 A1 | 4/2009 | Wiesemann et al. |
| 2011/0196881 A1 | 8/2011 | Deleris et al. |
| 2012/0035849 A1* | 2/2012 | Clark ................... G01C 23/00 701/467 |
| 2012/0078445 A1 | 3/2012 | Krupansky et al. |

* cited by examiner

METHOD AND SYSTEM FOR AIDING THE NAVIGATION OF AN AIRCRAFT

CROSS-REFERENCES TO RELATED APPLICATIONS

This application claims the benefit of the French patent application No. 1354766 filed on May 27, 2013, the entire disclosures of which are incorporated herein by way of reference.

BACKGROUND OF THE INVENTION

The present invention relates to a method and to a system for aiding the navigation of an aircraft, including a transport aircraft.

It is known that the majority of accidents or incidents involving an aircraft occur during phases of movement on an airfield, and in particular the following incidents:
- runway incursions;
- runway excursions;
- taxiway excursions; and
- collisions between aircraft, or between an aircraft and an airfield facility (a building, for example).

To solve these safety problems, there is known a system for aiding airport navigation, of a type known as OANS (On-board Airport Navigation System), which has its own database and takes over from the flight management system (FMS) on the navigation screen, known as ND (Navigation Display), to assist pilots in the tasks of preparing for and executing arrival on an area of ground. The main function of this OANS system is to display a dynamic map of the airport, of a type known as AMM (Airport Moving Map), which is oriented and positioned according to the location of the aircraft shown on it.

To change from one system to the other, in other words, from the display of flight navigation data (FMS) to the display of ground navigation data (OANS), on the ND screen, the pilot has to select a particular scale that allows him to view the AMM map instead of the flight plan from the FMS system, and to access the ground functions that enable him to prepare for arrival. This separation between the two systems, from an architectural point of view with separate databases, but also in terms of display, therefore introduces a discontinuity between the flight phases (approach) and the ground phases (landing), a break in the representation of the trajectory (both in terms of content and of display logic and interaction logic), and also a temporary loss of information for the pilot. The pilot must therefore construct for himself a mental representation of the trajectory from the current position to the final position, for example an airline's parking place.

Furthermore, while preparing for arrival on the ground using the ND screen, the pilot must refer to navigation maps such as the en route maps, maps for the standard departure or arrival procedure and for the departure procedure in the event of engine failure, known as SID (Standard Instrument Departure) and STAR (Standard Terminal Arrival Routes), approach maps, and maps of airports and taxiways. On some aircraft, pilots carry these navigation maps in their flight bag, which also contains the operations manuals, the flight manual, the checklists, and the performance data. On other aircraft, in order to make the bags carried by pilots lighter, this data (the navigation maps and also the different documents mentioned above) are available via an electronic system known as EFB (Electronic Flight Bag), which can be connected to the avionics systems. From document US 2012/0035849, there is known a flight information display device, comprising an information processing system that has a flight management computer and an EFB type of electronic system. In the standard forms of architecture, the EFB applications focus on the transition between the paper and the digital, and therefore restrict themselves to providing identical reproductions of the paper versions while adding a few functions to these, in order to minimize the time required to learn how to use this technology. The changes between the paper versions and digitized versions of the navigation maps are therefore minimized to facilitate the process of standardization and certification.

In both cases (paper or digital maps), the items of information presented are additional to those available on the ND screen: some items of information shown on the maps are not displayed on the ND screen and vice versa. This separation is found at an architectural level, because two databases (the FMS database and the maps database) coexist in the cockpit without communicating.

From the pilot's point of view, this emphasizes a second form of discontinuity in terms of sources and displays of navigation information. This is because he must constantly switch from one medium to the other and construct a mental picture of the situation by combining the information required to manage the aircraft's trajectory. In addition, each pilot constructs his own representation of the situation, which can lead to potential divergences between two members of the same crew.

This complex standard architecture, which has discontinuities, produces a significant workload for the crew.

SUMMARY OF THE INVENTION

The present invention relates to a system for aiding the navigation of an aircraft that enables this disadvantage to be remedied, reducing the crew's workload.

To that end, according to the invention, the system for aiding the navigation of an aircraft comprises:
- at least one navigation database;
- a display device comprising at least one display screen capable of displaying navigation information; and
- a central unit that is connected to said navigation database, which manages the display implemented by said display device and which comprises at least one unit for receiving current parameters relating to the aircraft and its environment, is distinctive in that:
- said system comprises at least one navigation database of a global type, which contains all the data necessary for the air navigation and airport navigation of the aircraft, as well as data given on navigation maps;
- said central unit is configured to perform a contextualized filtering of the information intended to be displayed on said display screen and originating at least in part from said navigation database of a global type, said contextualized filtering being performed in accordance with predefined rules depending on said current parameters relating to the aircraft and its environment, comprising at least the following parameters: the performance data for the aircraft, the flight phase and trajectory of the aircraft; and
- said display device is configured to produce a display on one and the same screen, namely said display screen, said display being based on information produced by the contextualized filtering.

Thus, by virtue of the invention, an aircraft pilot has available on a single screen all the information necessary for each phase that he is likely to encounter, namely the flight phases and the ground phases (including taxiing). The pilot therefore has no need, as in the prior art, to supplement the information displayed on a screen of the flight deck with information originating from the different standard maps. In addition, by virtue of the contextualized filtering, the pilot receives only the information that is required for each phase (flight or ground), which avoids him having to search, among a plurality of items of information, for the information that is actually required. This therefore enables the workload of the pilots to be reduced.

Within the scope of the present invention, the term "contextualized filtering" is understood to mean the selection of items of information according to the context at the current (actual) time, said context being defined according to various parameters relative to the aircraft and its environment and according to at least the parameters mentioned above.

In other words, the system according to the invention comprises an integration of the map-type data with the data from a standard FMS system, and a reworking of the standard modes of operation of the FMS system to form an integrated, dynamic and continuous navigation environment, enabling the pilot(s) to view all the data necessary to manage the trajectory on one and the same screen, preferably an ND-type navigation screen.

Within the scope of the present invention, a navigation database known as a global database therefore contains:
  all the data necessary for the air navigation of the aircraft;
  all the data necessary for the airport navigation of the aircraft; and
  the data normally given on navigation maps.

Advantageously, said system for aiding navigation has interface means enabling an operator to act on the display produced on said screen. Preferably, said interface means comprise means enabling an operator to adjust the level of zoom of the display produced on said screen, and the level of detail of the display is a function of the adjusted level of zoom.

Furthermore, advantageously, said parameters used for contextualized filtering comprise, in addition, at least some of the following parameters:
  features of the aircraft;
  a status of the aircraft;
  features of the departure or destination airport;
  features of a mission;
  the nature of a task of the crew;
  a crew classification; and
  dynamic parameters.

Moreover, advantageously, said filtering comprises different levels of contextualization, and at least some of the following levels:
  a selection of information with a view to display;
  a highlighting of displayed information; and
  an offer of access to information.

Furthermore, said system for aiding navigation can comprise at least some of the following features, taken individually or in combination:
  the display device is configured to allow the display on said screen of at least one graphic element allowing access to additional information relating to the subject to which said graphic element corresponds;
  the display device is configured to allow the display on said screen of at least one graphic element that can be used to construct a trajectory of the aircraft;
  said system for aiding navigation has a plurality of graphic elements that are organized into different layers of information, which an operator can select individually to render the subjects of the other layers inactive;
  said system for aiding navigation has a set of sources of information to produce current parameters relating to the aircraft and its environment;
  the display device is configured to show a window containing a simplified view of the current situation;
  the display device is configured to continuously display a trajectory of a gate-to-gate type, in other words, from the departure point to the arrival point;
  each phase of the aircraft is associated with a dedicated page of the display device, which contains all the corresponding information and which can be displayed on said screen;
  said system for aiding navigation is configured to compare parameters relating to the current time with elements contained in the global database in order to assist the pilot with specific tasks.

The present invention also relates to a method for aiding the navigation of an aircraft, via a system comprising:
  at least one navigation database;
  a display device comprising at least one display screen capable of displaying navigation information; and
  a central unit that is connected to said navigation database which manages the display implemented by said display device, and which comprises at least one unit for receiving current parameters relating to the aircraft and its environment.

According to the invention, said method is distinctive in that it comprises steps:
  of performing a contextualized filtering of the information intended to be displayed on said screen and originating at least in part from a global type of navigation database, this database (known as global) containing all the data necessary for the air navigation and airport navigation of the aircraft, as well as data given on the navigation maps, said contextualized filtering being performed in accordance with predefined rules depending on current parameters relating to the aircraft and its environment, and comprising at least the following parameters: aircraft performance data, the flight phase and the trajectory of the aircraft; and
  of displaying on one and the same screen, namely on said display screen, information produced by said contextualized filtering.

Furthermore, the present invention also relates to an aircraft, in particular a transport aircraft, that has a system for aiding navigation like the system mentioned above.

BRIEF DESCRIPTION OF THE DRAWINGS

The appended drawings will give a clear understanding as to how the invention can be embodied. In these drawings, identical references designate similar elements.

DETAILED DESCRIPTION OF THE PREFERRED EMBODIMENTS

Figure 1:
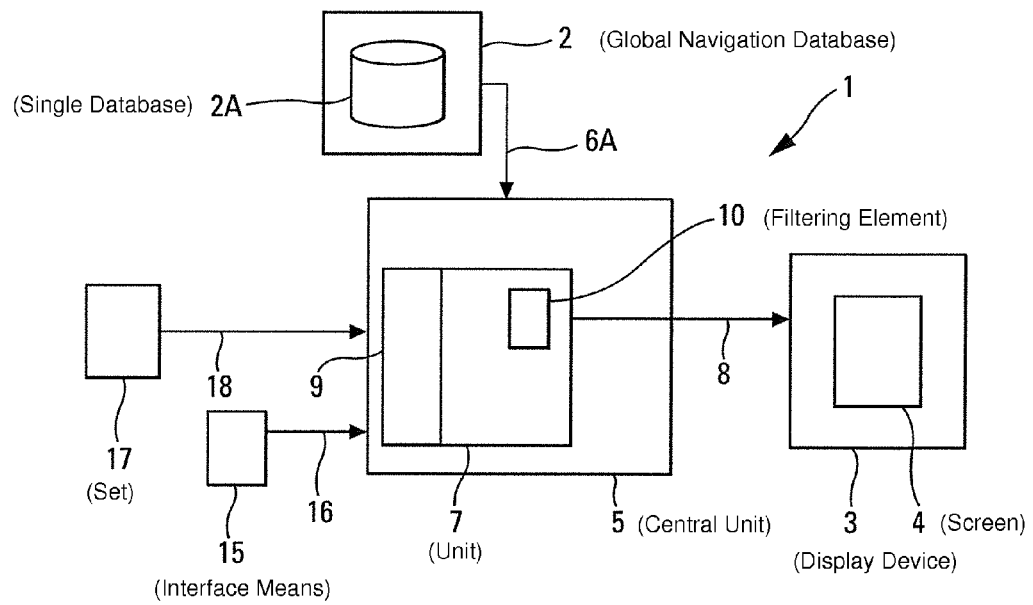
FIG. 1 is a block diagram of a system that illustrates an embodiment of the invention.

The system 1 shown diagrammatically in FIG. 1 and illustrating the invention, is intended to aid the crew of an aircraft AC during navigation.

Figure 2:
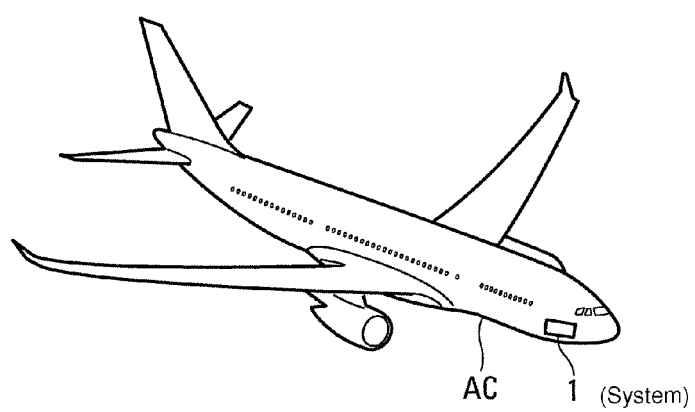
FIG. 2 shows an aircraft to which the present invention can be applied.

This system for aiding navigation 1 (which is on board the aircraft AC, in particular a transport aircraft, as shown very diagrammatically in FIG. 2) is of the type that has, in particular:

- at least one navigation database 2;
- a display device 3 comprising at least one screen 4 capable of displaying navigation information; and
- a central unit 5 that is connected to said navigation database 2 via a link 6A, 6B and which comprises:
  - a unit 7 for data processing and management, which manages the display implemented by said display device 3 via a link 8; and
  - a unit 9 for receiving current parameters relating to the aircraft AC and its environment.

According to the invention, said system 1 comprises a navigation database 2 known as a global database, namely a database that contains all the data necessary for the air navigation and airport navigation of the aircraft AC, as well as the data given on standard navigation maps.

In addition, according to the invention:

- said central unit 5 comprises a filtering element 10 which is, for example, integrated into the unit 7 and which performs contextualized filtering of the information intended to be displayed on said screen 4 and originating at least in part from said global navigation database 2. This contextualized filtering is performed, according to the invention, in accordance with predefined rules depending on current parameters relating to the aircraft AC and its environment. These parameters comprise at least the following parameters: performance data for the aircraft AC, the flight phase of the aircraft AC and the trajectory of the aircraft AC; and
- said display device 3 is configured to produce a display on one and the same screen, namely on said screen 4. This display produced on the screen 4 is based on information derived from the contextualized filtering implemented by the filtering element 10 of the central unit 5.

As an example, the screen 4 is an ND-type navigation screen, but the functions and principles of the present invention are applicable to any other screen on the flight deck of the aircraft AC.

Thus, by virtue of said system 1, a pilot of an aircraft AC has available, on a single screen 4, all the information necessary for each phase that he is likely to encounter, namely the flight phases and the ground phases (including taxiing). He therefore does not need to supplement the information displayed on the screen 4 with information originating from the various standard maps. In addition, by virtue of the contextualized filtering implemented by the element 10, only the information required for each phase (flight or ground) is displayed, which avoids the pilot(s) having to search, among a plurality of items of information, for the information that is actually required. These features enable the workload of the pilots of the aircraft AC to be reduced.

The system 1 therefore makes it possible to integrate map-type data with data from a standard flight management system (FMS) and to rework the standard modes of operation of the FMS system to form an integrated, dynamic and continuous navigation environment, enabling the pilot(s) to view all the data necessary for the management of the trajectory on one and the same display screen 4.

Within the scope of the present invention, a navigation database 2 known as "global" encompasses the following three sources of data:

- a flight management database (normally associated with the FMS system) for the air navigation of the aircraft AC (flight plan, etc.), which complies in particular with the ARINC 424 standard; and
- a database of airport data (topology of the airports for display (OANS, etc.)), which complies in particular with the ARINC 816 and Eurocae/RTCA DO99 standards; and
- data corresponding to the data normally given on navigation maps (information about the air traffic control (ATC) environment): altitude and speed restrictions, ATC frequencies, information related to the approaches (decision height, etc.), dangerous places at the airports, and so on.

The first two sources of data correspond to standardized databases. The third source of data corresponds to the retranscription into a (non-standardized) database of the information given on the maps.

Figure 3:
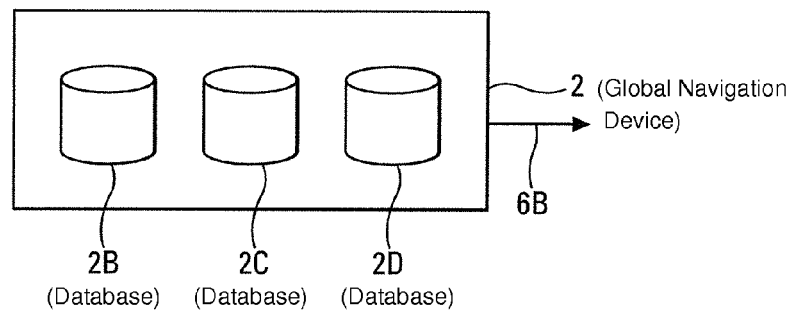
FIG. 3 is a block diagram of a specific embodiment of a global database.

The global navigation database 2 can therefore:

- either correspond to a single database 2A drawing together the information from the three sources named above, as shown in FIG. 1;
- or have three separate databases 2B, 2C and 2D corresponding to these three sources respectively, as shown in FIG. 3. In such a case, the system 1 collects the information (as shown diagrammatically by a global link 6B) from the three separate databases 2B, 2C and 2D before performing the filtering.

The system 1 enables the information from the navigation maps to be integrated into the screen 4 and into a standard display, providing, in addition, a continuous environment, in other words, an environment without any break between the different phases from the point of view of trajectory management. This system 1 applies to the phases at an airfield and more specifically to the transitional phases between flight and ground, such as taxiing, take-off, climbing, approach, landing and go-around, both in preparation and in execution.

Furthermore, said system 1 also has:

- interface means 15 which are connected via a link 16 to the central unit 5 and which enables an operator, in particular a pilot of the aircraft AC, to act on the display implemented on the screen 4, and to enter data into the central unit 5; and
- a set 17 of standard sources of information, for generating current parameters relating to the aircraft AC and its environment, said set 17 being connected via a link 18 to the central unit 5 (and in particular to the data-receiving unit 9).

The system 1 can therefore use any screen on the flight deck as a screen 4. However, the functions described below are presented with reference to an ND screen as an example.

Figure 4:
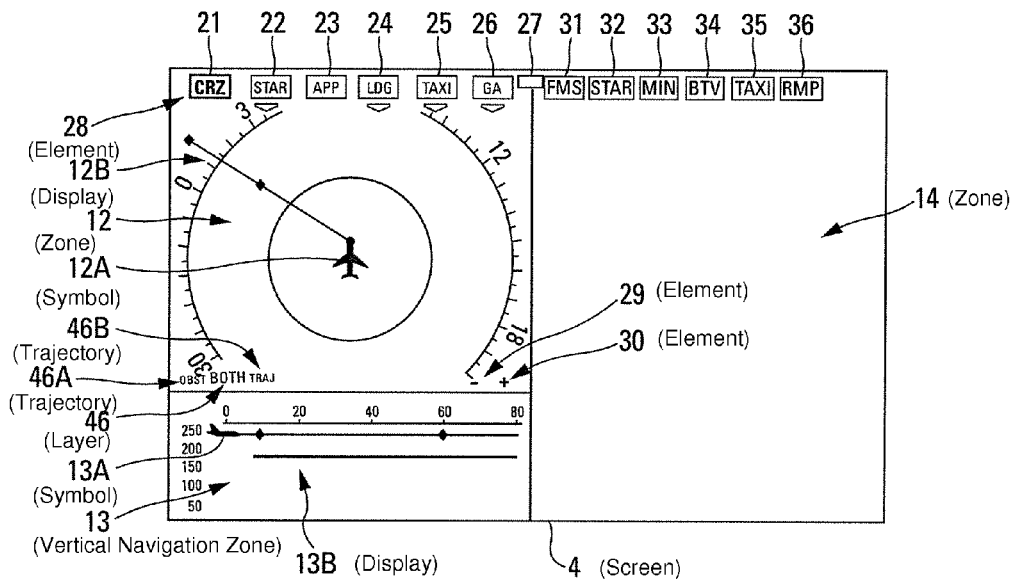
FIGS. 4 and 5 show some examples of a display enabling particular features of the invention to be highlighted.

In the example shown in FIG. 4, the screen 4 is separated into at least two zones, namely a lateral navigation zone 12 and a vertical navigation zone 13, with in each case a symbol 12A, 13A representing the aircraft AC and a corresponding standard display 12B, 13B, for example a horizontal ROSE-type display 12B. In this example, a large area of the screen 4 enables the two navigation zones 12 and 13 to be combined on a left part of the screen 4, and a zone 14 reserved for the display of flight plan data and of menus for constructing the trajectory is on a right part. This zone 14 includes, in its upper part, some graphic elements 31 to 36.

The interaction between the user and the system 1 (via the means 15 shown diagrammatically) can take place via tactile means or via any other standard means of interaction such as a cursor, a designator (a KCCU, for example), a keyboard, or voice or gesture recognition. As an example, in the text that follows, all the interactions are deemed to be made in a tactile manner on the screen 4 (the means 15 are then integrated directly into the screen 4).

The database 2 integrates all the required navigation data contained in the airport maps, SID, STAR, final approach and safety altitudes. This includes, in particular:
- the frequencies for ATC/ATIS/radionavigation means;
- the safety altitudes (MORA/MSA/MVA for example);
- the standard departure and arrival trajectories (SID/STAR);
- the final approach and go-around trajectories;
- the minima and corresponding decision altitudes/decision heights;
- the restrictions on standard trajectories in terms of altitude and speed;
- the obstacles or dangerous areas shown on the maps;
- the instructions and other textual information corresponding to the flight phases shown on the maps; and
- at least one map of an airfield, with the name and direction of the taxiways, the accessible taxiways, the stand entry maneuvers, the stand entry facilities, etc.

In order for the display to remain legible, the flight is broken down into phases corresponding to those shown on the standard maps. For each phase there is a dedicated page that contains all the items of information found on the corresponding map. Each page is accessible in plan mode, that is, oriented so that north is at the top.

A distinction is made between the current phase which corresponds to the phase that is flown at the current time tc and in a preferred embodiment is indicated via a green font, and the phase displayed on the screen 4 which corresponds to a time tc+Δt in the future. In FIG. 4, the current phase and the displayed phase are both the en route phase highlighted on a graphic element 21 ("CRZ"). The current phase is highlighted graphically by a particular color, for example in green, for "CRZ", and the displayed phase by highlighting the graphic element 21. The current phase displayed can be one of the other phases that can be highlighted via graphic elements 22 ("STAR"), 23 ("APP" for approach), 24 ("LDG" for landing), 25 ("TAXI"), 26 ("GA" for go-around). As an example, the pages can be accessed via a slider-type interface element 28 that the pilot positions on the phase of his choice, as shown in FIG. 1 (the interface element 28 being on the element 21).

On each page, the trajectory is, for example, shown in green (the color of the FMS trajectory) and the pilot is able to act on the screen 4 to move forwards or backwards in the flight chronology and view the previous or the next part of the trajectory, which is shown continuously.

The pages are presented automatically with the level of zoom optimized so that all the information about the flight phase and the information required for the preparation of this phase can be read and accessed. Furthermore, the pilot can use available tools (elements 29 ("−") and 30 ("+") in the example shown in FIGS. 4 and 5) to respectively reduce and increase the zoom.

This mode of exploration (called "discontinuous exploration of the flight plan") has the advantage of facilitating access to the information for each of the flight phases and thus within the chronology of the flight, while using one and the same system 1 and one and the same screen 4. This breakdown also enables a legible display to be maintained and avoids the problems caused by a cluttered screen. Furthermore, the pilot does not need to change mode to move between one page and another, as the presentation (north at the top) is activated automatically on moving from the current phase to another phase.

As indicated above, the FMS trajectory is shown continuously on the screen 4, including at the point of transition between the flight phases and the ground phases (between final approach and landing, for example, or between landing and the go-around trajectory).

Thus, as a complement to the discontinuous mode of exploration by flight phases detailed above, the system 1 also provides a continuous exploration of the flight plan, because the trajectory is shown continuously on the screen 4. The user can then act to move forward in the chronology of the trajectory, and can do this from any of the modes ROSE, ARC or PLAN. He can then access any part of the trajectory, including the ground phases.

A possible implementation of this concept is as follows: from the moment when a user begins to move the map to a time tc, the display retains the orientation of the map recorded at that time tc, until a waypoint is reached. At this point, the map adopts the orientation of the new portion of the trajectory situated immediately after this point. Furthermore, the compass rose may be duplicated, with one of the two remaining at its standard position around the aircraft symbol 12A while the second follows the movement ordered by the user, so that the user remains aware of the orientation of the map. Furthermore, it is intended that the user is given the ability via a graphic tool (not shown) to reorientate the map as he wishes. The user can also have a shortcut (not shown) enabling him to return the screen 4 to the current position of the aircraft AC.

This complementary mode of exploration has the advantage of enabling the pilot to quickly view the near future of the flight plan, while retaining the information about the current phase, and from ARC or ROSE mode. In addition, this mode of exploration gives a freedom from the normal rigid modes of display (ARC, ROSE and PLAN), which allows the pilot to view the aircraft's trajectory from his own point of view, without any effort of mental representation on his part.

Furthermore, as indicated above, the system 1 displays information that is contextual, in other words, selected according to the context at a current time tc. The context is defined according to different parameters which can be more or less static. As an example, these parameters can be at least some of the following parameters:
- some features of the aircraft AC (for example the wingspan);
- the status of the aircraft AC (equipment failures, for example);
- the status/features of the destination/departure (ILS failure, runway closed);
- the trajectory (current position and destination) and the mission;
- the flight phase;
- the nature of the pilot's task: strategic (planning/anticipation of possible adverse situations) or tactical (execution);
- the classification of the crew; and
- other dynamic parameters (weather, performance data, etc.).

The dynamic parameters are updated in real time, either by the crew (for example, using the interface unit 15), or automatically by the system 1 (via the set 17, for example), as they change, and the context changes in consequence, modifying the display on the screen 4. For example, in the event of a failure of the axis of the glide for an ILS-type landing aid system, the system 1 is informed either by an input from the pilot, or automatically by receiving a piece of information by data transmission, and it suggests replacing the minimum value displayed by the new applicable value.

The system 1 provides different levels of contextualization, and in particular:

- selection of information: certain items of information are selected and considered to be relevant to a given context, and are displayed on the screen 4. The other items of information are not shown to the pilot;
- highlighting of information: it is considered that for a given context (often of a fairly short duration), it is necessary to draw the pilot's attention, via visual signals, to an item of information already shown on the screen 4. For example, the ATIS frequency displayed flashes when the aircraft AC is sufficiently close to the destination on the ground to receive it; and
- access to items of information at the pilot's request: certain items of information (text instructions, for example) are often already known to pilots. They are therefore offered to the pilot, who can choose whether or not to view them, for example in the form of a section that opens out and closes. For example, in the lateral navigation zone 12 there may be a graphic element (not shown) which indicates to the pilot that there is a text instruction relating to the corresponding phase that he can view. If he opens out this panel using appropriate interaction means, he then finds the text in a display area (representing a displayed window).

The contextualization of the display has the advantage of making it possible to incorporate items of information without posing the problem of overloading, and to considerably reduce the cognitive load on the pilot by relieving him of all the tasks of sorting and selecting information. The different levels of contextualization also make it possible to adapt to the pilot's expertise and task.

Figure 5:
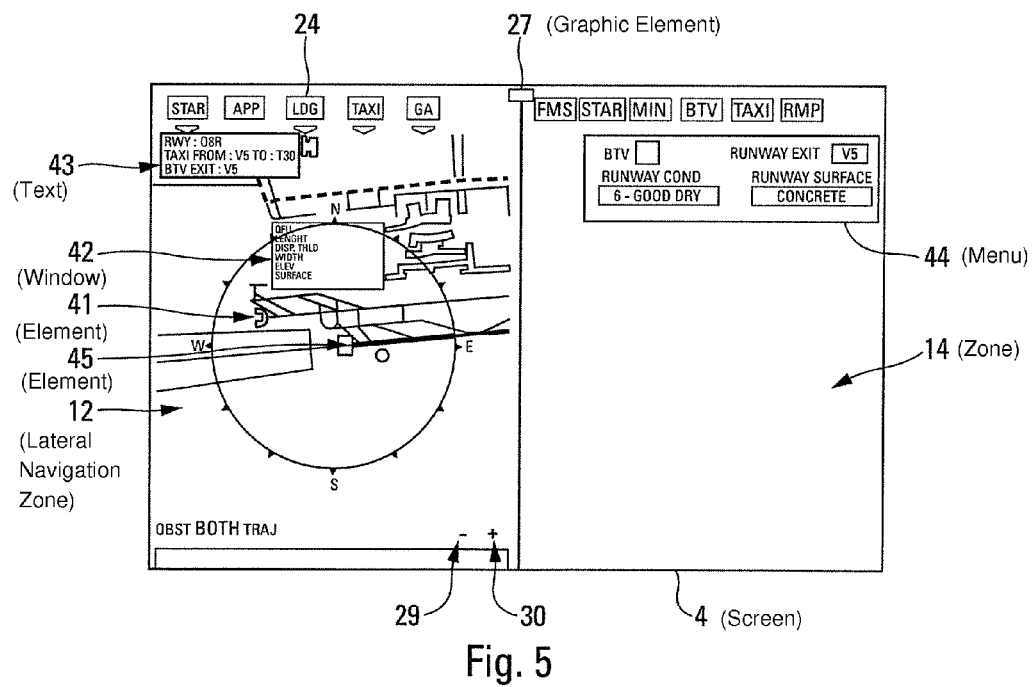

Furthermore, as indicated above, certain items of information must be accessible only at the pilot's request in order to avoid overloading the display and to take the pilot's level of experience into account. To do this, some graphic elements allow access to additional information about the subject that they represent in reality. Thus, by clicking on a subject, the pilot can make information appear about the nature of the subject, the associated instructions, and so on. FIG. 5 illustrates this principle: for example, by clicking on a particular graphic element 41 (relating to a displayed runway, for example), the pilot can make a window 42 appear, containing information such as the dimensions of the runway or the available landing or take-off distances (depending on the context).

In the same way, any form of text representing elements of the trajectory can be a means of accessing menus that enable the corresponding parameters to be adjusted. Thus, in FIG. 5, the text 43 indicating BTV exit (via an automatic braking operation—Brake To Vacate) and the stand can be highlighted in order to indicate the interactivity to the user, and gives access to the menu 44 displayed in the right-hand part 14, which enables the user to adjust the BTV parameters such as the exit ("RUNWAY EXIT"), the condition ("RUNWAY COND") and the runway surface ("RUNWAY SURFACE"). Other text items that allow access to menus can be, for example, the decision altitude or decision height.

This has the advantage of giving direct access to an item of information while restricting the space occupied on the screen 4. Furthermore, the information is only presented in situations in which the pilot actually needs it, thus taking into account the pilot's experience of the terrain.

The graphic objects can also be used as means for constructing the trajectory. By placing himself on the landing page (graphic element 24) shown in FIG. 5 as an illustration of the concept, the pilot can use interaction means to click on a graphic element 45 representing the runway on which he wishes to land, in order to select it and select the type of approach that he wishes to make. This mode of interaction must be considered as an additional means (relative to the different standard FMS menus) for constructing the trajectory.

In order to limit interaction errors, the graphic elements are organized into layers of information that the pilot can select in order to deactivate the subjects of the other layers, for example, by positioning the interface element 28 (slider) shown in FIG. 4 on the layer of his choice or by using another interaction means. The subjects that do not belong to the selected layer are placed in the background via a graphic means (for example by being grayed out) and are no longer interactive. Conversely, those that belong to this layer are highlighted, for example by being shown in an appropriate color, and retain their interactive character, in other words, the pilot can click on them to obtain additional information or construct a part of the trajectory.

As an illustration, the example shown in FIG. 4 makes it possible to choose between two interaction layers (obstacle "OBST" (46A) and trajectory "TRAJ" (46B)) and a layer (46) that brings them together. If the user places the "slider" interface element 28 on the obstacle layer (46A), a STAR trajectory and a go-around trajectory appear grayed-out and the obstacle is shown in an appropriate color (these latter elements are not shown in FIG. 4).

The integration of the map data into a navigation environment enables the pilot to view all the data that he needs to manage the aircraft's trajectory on one and the same screen 4, on which he can therefore carry out his preparatory tasks for future flight phases. A function of viewing the current situation enables the pilot to retain a clear awareness of the current situation whilst he is performing the preparatory tasks.

Figure 6:
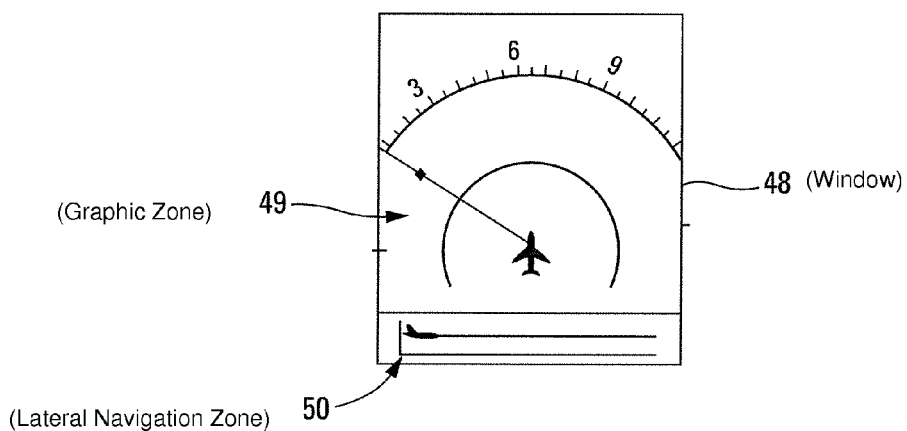
FIG. 6 illustrates a particular window that can be displayed on a screen.

This function consists of providing the pilot, for example on the part of the screen 14, with a window 48 (or any other graphic container), as in the example shown in FIG. 6, that contains a simplified view of the current situation, in other words, a reproduction of the tactical ND display, on which the pilot can monitor the development of the navigation via essential elements such as passing waypoints or the distance relative to the safety altitudes. The view can be broken down like an ND screen into two graphic zones 49 and 50: a lateral navigation zone 49 and a vertical navigation zone 50 which can be displayed or not displayed depending on the presence of vertical events or elements, such as the beginning of the descent, vertical actions to be performed, moving closer to safety altitudes, and so on.

The window 48 can be displayed at the pilot's request (via interface means 15), or automatically when the pilot moves to a page corresponding to a future phase, or automatically again when the aircraft AC flies over a key element in the flight plan such as a waypoint or enters a potentially dangerous location (if it is approaching an obstacle, for example).

This function has the advantage of enabling the pilot to retain an awareness of the current situation while preparing for subsequent phases, during preparation for approach, for example. If he notices a potential problem, he can then return rapidly to the page for the current phase.

The integration of navigation information into one and the same system 1 also enables said system 1 to compare different parameters of the situation at a current time tc with the elements contained in the global database 2 available to it in order to aid the pilot in certain types of task.

First of all, the values in the menus can be preselected for the pilot, from, firstly, data provided in the database 2 and, secondly, from items of information that can be extracted from different standard ATIS or NOTAM messages, and from weather maps. For example, the BTV menu can be adjusted by the system 1 as follows: the runway surface is held in the navigation database. The condition of the runway can be extracted from the ATIS. When the user goes to the menu, the different fields are already filled, but the user has the option of modifying the default values. For certain menu elements, an interactive means can be provided to give notification of any automatic update of a selected value.

In addition, depending on the context of the flight, and also the usual practice of the airline, the system 1 can assist the pilot in constructing a trajectory. For example, an airline often uses the same parking places at an airfield and therefore often uses the same taxiways. In accordance with this information and with dynamic parameters (runway accessibility, closed runways, weather conditions), the system 1 can automatically suggest a route which the pilot can confirm or reject.

The level of automation enables the pilot's workload to be made lighter by assisting him in the decision-making tasks and by substituting for him in other tasks.

The system 1 enables a user (pilot) to access a representation of the trajectory known as "gate-to-gate", in other words from the departure airport and where applicable from the departure stand, to the arrival airport and where applicable the arrival stand. The user can access this view via an appropriate graphic element, for example the graphic element 27 shown in FIGS. 4 and 5, which enables him to open out a panel containing a gate-to-gate representation of the trajectory.

In order to represent all the portions of the trajectory, giving them the same level of importance regardless of the distance covered by this portion, several solutions are envisaged. For example, the trajectory can be represented in a not-to-scale manner, in other words, in such a way that the distances between two points on the map are not representative of the actual distances. A standard distance between two points is then used, which enables the same graphics area to be used for the en route phase and the approach phase, for example.

In addition, this view can be enriched by different items of information, for example zones in which ATC frequencies change, the terrain, the weather, a background map showing frontiers. Likewise, it can be used as a means of constructing a trajectory, either by manipulating the graphic elements directly, or by providing shortcuts to the corresponding FMS menus.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A system for aiding the navigation of an aircraft, said system comprising:
    at least one navigation database;
    a display system comprising at least one display screen capable of displaying navigation information; and
    a central unit that is connected to said navigation database, which manages the display implemented on said display system and which comprises at least one unit for receiving current parameters relating to the aircraft and its environment based on performance data for the aircraft, a flight phase of the aircraft, and a trajectory of the aircraft, wherein:
    said system comprises at least one navigation database of a global type, which contains all the data necessary for the air navigation and airport navigation of the aircraft, as well as data given on navigation maps;
    said central unit configured to perform a contextualized filtering of the information intended to be displayed on said display screen and originating at least in part from said navigation database of a global type, said contextualized filtering being performed in accordance with predefined rules depending on said current parameters relating to the aircraft and its environment, comprising at least the following parameters: the performance data for the aircraft, the flight phase and trajectory of the aircraft, and dynamic parameters updated in real time, said contextualized filtering comprising different levels of contextualization, and at least one of the following levels:
    a selection of information with a view to display relevant to a given context;
    a highlighting of displayed information for the given context via visual signals; and
    an offer of access to information displayed in a separate graphic element having at least one text instruction relating to a current flight phase; and wherein said contextualized filtering is performed based on said current parameters and said levels of contextualization; and
    said display system produces a display on one and the same screen, namely on said display screen, of information produced by said contextualized filtering performed by the central unit such that the information required by the contextualized filtering is displayed on said display screen.

2. The system according to claim 1, including an interface enabling an operator to act on the display produced on said display screen.

3. The system according to claim 2, wherein said interface allows an operator to adjust the level of zoom of the display produced on said display screen, and the level of detail of the display is a function of the adjusted level of zoom.

4. The system according to claim 1, wherein said parameters further comprise at least some of the following parameters:
    features of the aircraft;
    a status of the aircraft;
    features of the departure or destination airport;
    features of a mission;
    the nature of a task of the crew;
    a crew classification; and
    dynamic parameters.

5. The system according to claim 1, wherein said display system displays on said display screen at least one graphic element allowing access to additional information relating to the subject to which said graphic element corresponds.

6. The system according to claim 1, wherein said display system displays on said display screen at least one graphic element that can be used to construct a trajectory of the aircraft.

7. The system according to claim 5 further comprising a plurality of graphic elements that are organized into different layers of information, which an operator can select individually using a selection device to render the subjects of the other layers inactive.

8. The system according to claim 1, wherein said display system has a window containing a simplified view of the current situation.

9. The system according to claim 1, wherein said display system continuously displays a trajectory of a gate-to-gate type.

10. The system according to claim 1, wherein each phase of the aircraft is associated with a dedicated page of the display system, which contains all the corresponding information and which can be displayed on said display screen.

11. The system according to claim 1, said system configured to compare parameters relating to the current time with elements contained in the global database in order to assist the pilot with specific tasks.

12. A method for aiding the navigation of an aircraft, via a system comprising:
- at least one navigation database;
- a display system comprising at least one display screen capable of displaying navigation information; and
- a central unit connected to said navigation database which manages the display implemented by said display system, and which comprises at least one unit for receiving current parameters relating to the aircraft and its environment based on performance data for the aircraft, a flight phase of the aircraft, and a trajectory of the aircraft, said method comprising the steps:
- performing a contextualized filtering of the information intended to be displayed on said screen and originating at least in part from a global type of navigation database, said database containing all the data necessary for the air navigation and airport navigation of the aircraft, as well as data given on navigation maps, said contextualized filtering being performed in accordance with predefined rules depending on current parameters relating to the aircraft and its environment, and comprising at least the following parameters: performance data of the aircraft, the flight phase and the trajectory of the aircraft, and dynamic parameters updated in real time, said contextualized filtering comprising different levels of contextualization, and at least one of the following levels:
- a selection of information with a view to display relevant to a given context;
- a highlighting of displayed information for the given context via visual signals; and
- an offer of access to information displayed in a separate graphic element having at least one text instruction relating to a current flight phase; and wherein said contextualized filtering is performed based on said current parameters and said levels of contextualization; and
- displaying on one and the same screen, namely on said display screen, information produced by said contextualized filtering such that the information required by the contextualized filtering is displayed on said display screen.

13. An aircraft comprising: a system for aiding the navigation of an aircraft, said system comprising:
- at least one navigation database;
- a display system comprising at least one display screen capable of displaying navigation information; and
- a central unit that is connected to said navigation database, which manages the display implemented on said display system and which comprises at least one unit for receiving current parameters relating to the aircraft and its environment based on performance data for the aircraft, a flight phase of the aircraft, and a trajectory of the aircraft, wherein:
said system comprises at least one navigation database of a global type, which contains all the data necessary for the air navigation and airport navigation of the aircraft, as well as data given on navigation maps;
said central unit configured to perform a contextualized filtering of the information intended to be displayed on said display screen and originating at least in part from said navigation database of a global type, said contextualized filtering being performed in accordance with predefined rules depending on said current parameters relating to the aircraft and its environment, comprising at least the following parameters: the performance data for the aircraft, the flight phase and trajectory of the aircraft, and dynamic parameters updated in real time, said contextualized filtering comprising different levels of contextualization, and at least one of the following levels:
a selection of information with a view to display relevant to a given context;
a highlighting of displayed information for the given context via visual signals; and
an offer of access to information displayed in a separate graphic element having at least one text instruction relating to a current flight phase; and wherein said contextualized filtering is performed based on said current parameters and said levels of contextualization; and
said display system produces a display on one and the same screen, namely on said display screen, of information produced by said contextualized filtering performed by the central unit such that the information required by the contextualized filtering is displayed on said display screen.

* * * * *